United States Patent [19] [11] 4,338,106
Mizuno et al. [45] Jul. 6, 1982

[54] CANISTER FOR FUEL EVAPORATIVE EMISSION CONTROL SYSTEM

[75] Inventors: Junzi Mizuno; Akira Fukami, both of Okazaki; Hiroki Noguchi, Oobu; Takeshi Ishii, Anjo, all of Japan

[73] Assignees: Nippon Soken, Inc., Nishio; Nippondenso Co., Ltd., Kariya, both of Japan

[21] Appl. No.: 203,570

[22] Filed: Nov. 5, 1980

[30] Foreign Application Priority Data

Nov. 9, 1979 [JP] Japan ............................... 54-145802

[51] Int. Cl.[3] ...................... B01D 53/04; F02M 37/00

[52] U.S. Cl. .................................... 55/316; 55/385 B; 55/387; 55/418; 123/519

[58] Field of Search ..................... 55/201, 385 B, 387, 55/389, 418, 316; 123/518–521

[56] References Cited

U.S. PATENT DOCUMENTS 3,000,467 9/1961 Bowers ................................ 55/201
3,479,146 11/1969 Hochman et al. ................ 55/418 X
3,628,517 12/1971 Soberski ............................. 123/520
3,683,597 8/1972 Beveridge et al. ............... 55/387 X
3,730,158 5/1973 St. Amand .......................... 123/519
3,884,204 5/1975 Krautwurst et al. ............... 123/519
4,058,380 11/1977 King ..................................... 55/387
4,173,207 11/1979 Hiramatsu ........................... 123/519
4,203,401 5/1980 Kingsley et al. ................. 55/387 X
4,280,466 7/1981 Walters .............................. 123/520

FOREIGN PATENT DOCUMENTS 53-77923 7/1978 Japan .................................... 55/387

*Primary Examiner*—Robert H. Spitzer
*Attorney, Agent, or Firm*—Cushman, Darby & Cushman

[57] ABSTRACT

In a canister for a fuel evaporative emission control system of an automotive vehicle, a deflector of the conical frustum shape is embedded in the adsorbent layer of the canister. A diameter of the deflector gradually increases upwardly and a bottom of the deflector faces to the end of the inlet conduit. Dimensional relations of various parts of the deflector are specified. The deflector may include a check valve mounted on the underside of the bottom of the deflector.

9 Claims, 8 Drawing Figures

CANISTER FOR FUEL EVAPORATIVE EMISSION CONTROL SYSTEM

BACKGROUND OF THE INVENTION

1. Field of the Invention

The present invention relates to an improvement in a structure of a canister used in an evaporative fuel emission control system of an internal combustion engine for a motor vehicle.

2. Description of the Prior Art

There has been known a control system for the capture of evaporated fuel from a fuel tank or a float chamber of a carburetor to reduce HC emissions. For adsorbing the fuel vapors, a canister filled with a mass of adsorbent substance such as activated carbon particles is used in the fuel evaporative emission control system.

One type of such canister for an automotive engine is disclosed, for example, in Japanese Patent Application Laid-Open No. 77923/78. In this device, an adsorbent substance comprising activated carbon particles is charged in a vessel 1 as shown in FIG. 1, to form an adsorbent layer 4. The layer has embedded a deflector 14 of conical frustum shape including a bottom 14*a* positioned against an end portion of a vaporized fuel inlet tube 12.

Meanwhile, in the illustrated device of the prior art, a check valve 16 for introducing air in order to purge the vaporized fuel into the interior of the adsorbent layer 4 is mounted on the underside of the bottom 14*a* of the deflector 14 and a purging chamber 11 is formed at the bottom of the vessel 1.

The check valve 16 which is opened by utilizing the vacuum produced in an intake manifold of the engine is independent of a port 11*a* formed in the purging chamber 11 and is maintained in communication with the atmosphere.

Thus, the relation between the pressure tending to open the check valve 16 and the air-flow resistance from the atmosphere to the purging chamber 11 is a problem. That is, when the resistance offered to the air-flow is lower than the pressure tending to open the check valve 16, the check valve 16 is not opened. Then the adsorbent surrounded by the deflector 14 will not be purged. On the other hand, when the resistance is higher than the pressure, the check valve 16 is opened. However, when the resistance is high in this case, the purging ability of the adsorbed fuel will be reduced because of the reduction of the purging air.

SUMMARY OF THE INVENTION

Adsorption of the vaporized fuel on the adsorbent layer is commenced at the end portion of the vaporized fuel inlet tube and gradually spreads in the adsorbent layer. The spreading of the adsorbed fuel vapor on the adsorbent layer is governed by a "flow" and a "diffusion" of the fuel vapor. A study conducted by us has made clear that the "flow" is the predominant factor concerned in this phenomenon and that the "diffusion" is a negligible factor.

FIG. 1 shows a device of the prior art in which the vaporized fuel flows along a path of least resistance when it is taken into consideration that the "flow" is, in actual practice, the predominant factor. That is, the flow is as indicated by arrows therein. Thus it will be clear that there are three regions A, B and C as indicated by hatching in which the adsorbent layer 4 is not utilized.

In the fuel evaporative emission control system, an object of the invention is to obviate the defects of the hitherto known canister and provide an improved structure of the canister which has utilized the adsorbent effectively and minimized the non-adsorbing region.

In view of the above, the canister according to the present invention is characterized by a feature that the canister comprises an adsorbent substance layer for adsorbing thereon vaporized fuel produced in a fuel tank and/or a fuel bowl of the carburetor, a vessel containing the adsorbent layer, glass wool filters disposed on the adsorbent and beneath the adsorbent layer to hold the latter in place, a vaporized fuel inlet conduit mounted at one end of the vessel and having an end portion inserted in the adsorbent layer and a deflector of the conical frustum shape spreading toward an edge portion of the one end of the vessel and having a bottom faced to the end of the vaporized fuel inlet conduit, wherein the ratio (f/e) of the distance (f) between the end of the vaporized fuel inlet conduit and the surface of the bottom of the deflector to the inner diameter (e) of the end portion of the vaporized fuel inlet conduit is in the range between 0.7 and 1.4, the ratio (S1/S2) of the horizontal cross-sectional area of an upper end of the deflector having a maximum diameter (d1) to the horizontal cross-sectional area (S2) of the adsorbent layer in the vessel is in the range between 0.4 and 0.6, and the ratio (a/b) of the distance (a) between the upper end of the deflector and the upper surface of the adsorbent layer to the distance (b) between the upper end of the deflector member and the side surface of the adsorbent layer is in the range between 0.8 and 1.5.

With the aforesaid construction, the device according to the invention enables the non-adsorbing regions in the adsorbent layer in the vessel to be minimized as compared with the prior art, to thereby increase the rate of utilization of the activated carbon. And the canister is enhanced significantly in adsorptive capability.

DESCRIPTION OF THE PREFERRED EMBODIMENTS

Figure 1:
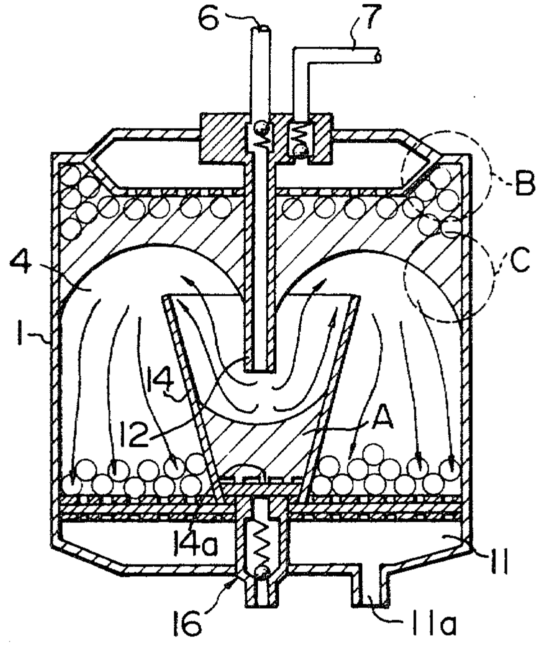
FIG. 1 PRIOR ART
FIG. 1 is a sectional view of a canister for fuel evaporative emission control systems of the prior art.

The embodiments of the invention will now be described by referring to the drawings.

Figure 2:
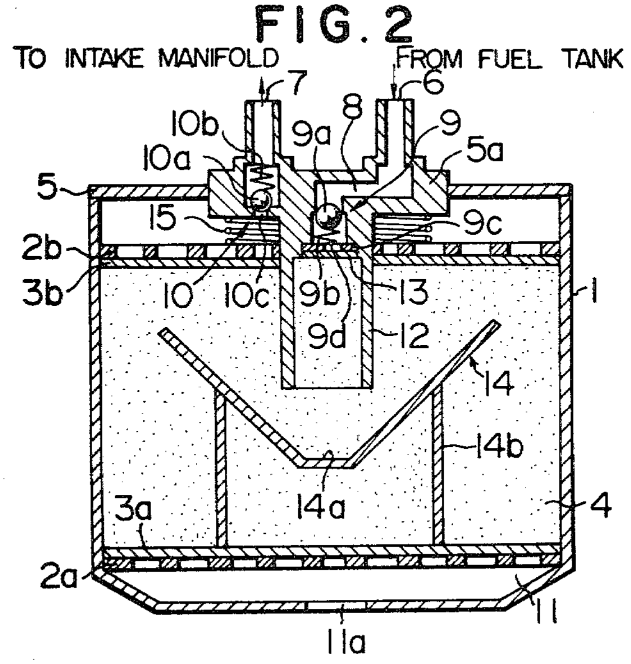
FIG. 2 is a sectional view of the canister comprising one embodiment of the invention.

In FIG. 2, there is shown a first embodiment of the invention comprising a metal vessel 1 of a cylindrical shape, a punched metal plate 2*a* formed with a multiplicity of perforations secured in the form of a shelf to a lower portion of the metal vessel 1*a*, glass wool filter 3*a* superposed on the punched metal plate 2*a*, and an adsorbent layer 4 such as activated carbon superposed on the glass wool filter 3*a*. Another glass wool filter 3*b* is superposed on the adsorbent layer 4, and another punched metal plate 2*b* is superposed on the glass wool filter 3*b*. A cover 5 is fixed to the upper open end of the vessel 1. A valve base 5*a*, which is set with the cover 5, has a vaporized fuel inlet passage 6 and a mixture outlet passage 7. Although not shown, the vaporized fuel inlet passage 6 communicates with a fuel tank (or carburetor float chamber) via a vaporized fuel flowing line, and the mixture outlet passage 7 communicates with the intake manifold of the engine via a mixture flowing line. A compression spring 15 is interposed between the valve base 5*a* and the punching plate 2*b*.

The valve base 5*a* comprises therein a passage 8*a*, check valve 9 for controlling the flow of fuel vapor from the vaporized fuel inlet passage 6, and a check valve 10 for controlling the flow of a fuel-air mixture from the vessel 1 to the mixture outlet passage 7. The check valve 9 comprises a check ball 9*a* and a spring 9*b* for pressing the check ball 9*a* against an opening of the passage 8. The check valve 9 allows an inflow of fuel vapor through an inlet port 9*d* formed in a support plate 9*c* into the adsorbent layer 4 when the vaporized fuel in the fuel tank has reached a predetermined pressure. The check valve 10 comprises a check ball 10*a* and a spring 10*b* for pressing the check ball 9*a* against a mixture outlet port 10*c*. The check valve 10 allows an outflow of a fuel-air mixture to the mixture outlet passage 7 when the sub-atmospheric vacuum pressure in the intake manifold has reached a predetermined level. Meanwhile a purging chamber 11 is formed at a bottom portion of the vessel 1 and open to the atmosphere through a port 11*a*.

The valve base 5*a* has, at its undersurface, a vaporized fuel inlet conduit 12 which communicates with the vaporized fuel inlet port 9*d*. The inlet conduit 12 is larger in diameter than the inlet port 9*d* and includes a lower end portion extending through the center of the punched plate 2*b* and glass wool filter 3*b* into the adsorbent layer 4. The conduit 12 is filled with activated carbon which reaches the almost same upper level as the adsorbent layer 4 and which is covered at its top with a glass wool filter 13.

Embedded in the adsorbent layer 4 in a position below the end of the inlet conduit 12 is a deflector 14 of the conical frustum shape having its diameter gradually increasing upwardly. The deflector 14 includes a bottom 14*a* faced to the end of the inlet conduit 12 and is supported by four rod-shaped legs 14*b* extending from the underside of the conical wall to the glass wool filter 3*a* in the vessel 1.

When the engine is at a stop, the fuel vapor produced in the fuel tank opens the check valve 9 at the time its pressure reaches a predetermined level. The fuel vapor flows through the inlet conduit 12 into the adsorbent layer 4 to be adsorbed. The check valve 10 is opened when the vacuum in the intake manifold reaches a predetermined level during engine operation. As a result, air is drawn into the vessel 1 from the port 11*a* through the purging chamber 11. This flow of air purges the adsorbed fuel vapor from the adsorbent layer 4, so that a fuel-air mixture is supplied to the engine through the outlet port 10*c*. Even if a large volume of fuel vapor is produced and the check valve 9 is opened during engine stop, the fuel vapor flowing into the vessel 1 is not allowed to pass through the outlet port 10*c* because the outlet port 10*c* is blocked by the check valve 10.

The results of tests conducted on the dimensions of the deflector 14 in relation to its adsorptive capability (the ratio of the utilized volume of the adsorbent layer 4 to the overall volume of the adsorbent layer 4) with regard to the device of the aforesaid construction will now be described, by referring to FIGS. 3–5. Reference should be had to the symbols a, b, d1, d2, e and f shown in FIG. 6.

Figure 3:
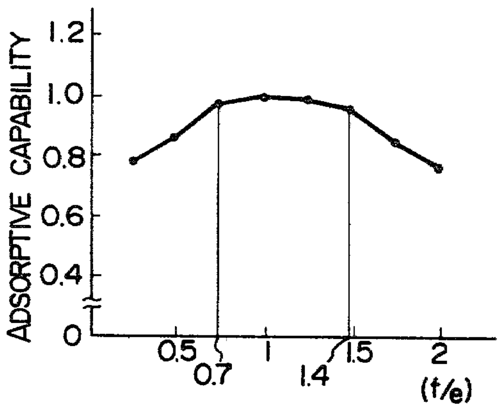
FIGS. 3–5 are diagrams showing the relation between the dimensions of the deflector and the adsorptive capability of the canister.

FIG. 3 is a diagram showing the relation between the adsorptive capability and the ratio (f/e). In FIG. 3, it will be seen that the adsorptive capability remains substantially constant when the ratio (f/e) is in the range between 0.7 and 1.4. This shows that when the ratio (f/e) is greater than 1.4, the vaporized fuel from the inlet conduit 12 is prevented from reaching the portion of the layer 4 near the bottom 14*a* of the deflector 14. And in this portion, the activated carbon is not utilized. Meanwhile when the ratio f/e is smaller than 0.7, the resistance offered to the flow of vaporized fuel increases and adverse influences are exerted on the subsequent flow of fuel. As a result, the adsorptive capability is reduced. Thus by setting the ratio f/e in the range between 0.7 and 1.4, the non-adsorbing region A of the adsorbent layer 4 in the canister of the prior art shown in FIG. 1 can be eliminated.

Figure 4:
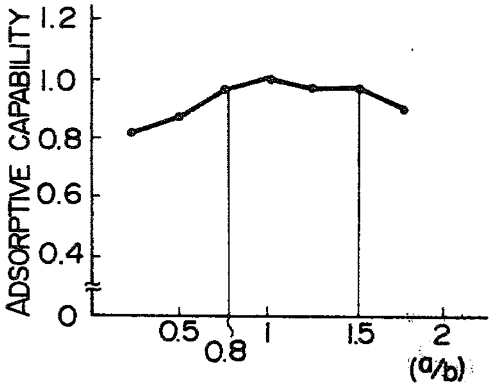

FIG. 4 is a diagram showing the relation between the adsorptive capability and the ratio (a/b). It will be seen that when the ratio (a/b) is in the range between 0.8 and 1.5, the adsorptive capability remains substantially constant. That is, when the ratio (a/b) is greater than 1.5, it is difficult for the fuel vapor to reach the edge of the upper end of the layer 4. Meanwhile when the ratio (a/b) is smaller than 0.8, the resistance offered to the flow of the fuel vapor between the upper end of the deflector member 14 and the upper surface of the layer 4 or between the upper end of the deflector member 14 and the side surface of the layer 4 increases. As the result, adverse influences exerted on the subsequent flow of the fuel vapor. Thus by setting the ratio (a/b) in the range between 0.8 and 1.5, the non-adsorbing region B in the canister of the prior art shown in FIG. 1 can be eliminated.

Figure 5:
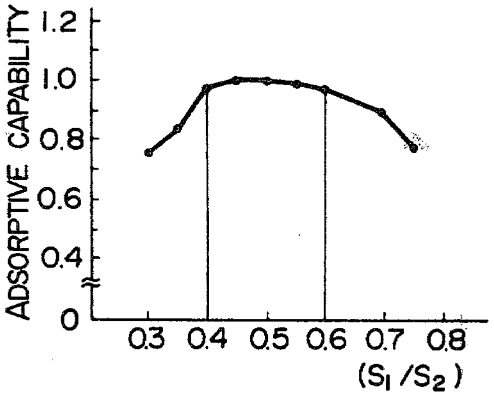

FIG. 5 shows the relation between the adsorptive capability and the ratio (S1/S2). In this figure, it will be seen that the adsorptive capability substantially remains constant when the ratio (S1/S2) is in the range between 0.4 and 0.6. When the ratio (S1/S2) is greater than 0.6, the resistance offered to the flow of the fuel vapor at the end of the deflector 14 is increased and it is difficult for the fuel vapor to flow uniformly. When the ratio S1/S2 is smaller than 0.4, the portion indicated by b in FIG. 6 becomes larger in cross-sectional area and the flow of vaporized fuel becomes, as shown in FIG. 1, leaving the non-adsorbing region C. Thus by setting the ratio (S1/S2) in the range between 0.4 and 0.6, the non-adsorbing region C shown in FIG. 1 can be eliminated.

Figure 6:
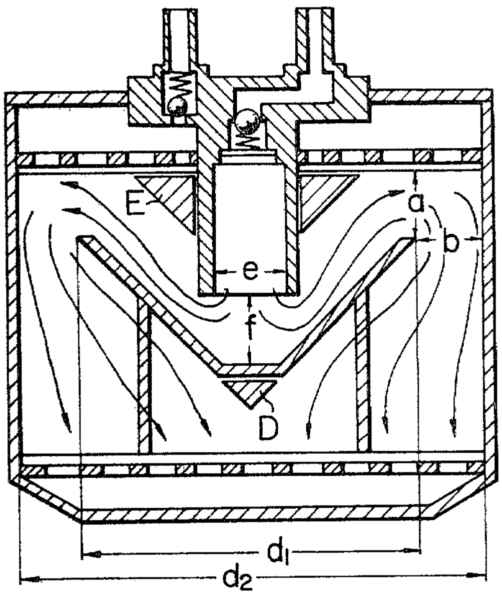
FIG. 6 is a sectional view of the embodiment shown in FIG. 2 of the invention showing the flow of the vaporized fuel.

In the embodiment of the invention shown in FIG. 6, non-adsorbing regions D and E are produced in the adsorbent layer 4. However, such regions D and E are smaller than the non-adsorbing regions A, B and C of the prior art shown in FIG. 1. Thus the embodiment of the invention shown in FIG. 2 has utilized the adsorbent more effectively than the canister of the prior art shown in FIG. 1.

By perforating the vaporized fuel inlet conduit 12, the non-adsorbing region E can be eliminated.

Figure 7:
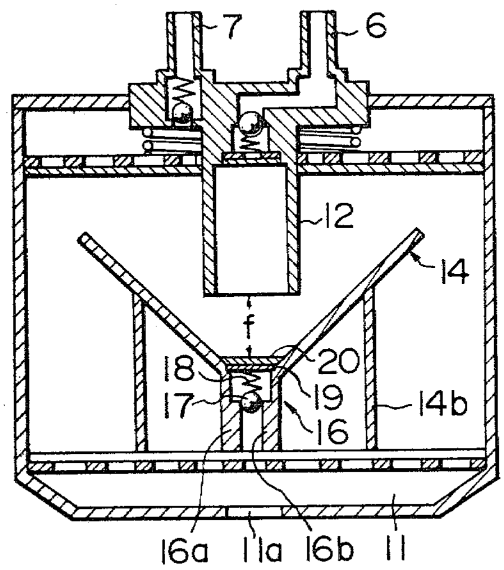
FIG. 7 is a sectional view showing another embodiment of the invention.

FIG. 7 shows another embodiment of the invention, wherein the deflector 14 is formed at its bottom with a check valve 16. The check valve 16 comprises a valve body 16*a* formed with a bore 16*b*, a check ball 17 and a spring 18 therein. The glass wool filter 20 has been placed on the spring keep plate 19 (such as punched metal or mesh). The bore **16*b* of the check valve 16 communicates at the end with the purging chamber 11. In the canister of the construction shown in FIG. 7, when the sub-atmospheric pressure produced by the engine operation has generated a pressure difference in the adsorbent layer 4, check valve 16 is opened and the air flows through the bore 16*b***. Thus, it is not necessary that the airflow resistance from the atmosphere to the purging chamber is increased forcedly as in the prior art.

That is, the air is introduced into the region of the adsorbent layer surrounded by the deflector 14. Therefore, the fuel vapor adsorbed in this region is purged by the air. Thus, the adsorptive capability is increased. By the provision of the check valve 16, the non-adsorbing region D in FIG. 6 can be eliminated.

It goes without saying that in the embodiment shown in FIG. 7, the ratios (f/e), (a/b) and (S1/S2) should be in the range between 0.7 and 1.4, between 0.8 and 1.5 and between 0.4 and 0.6, respectively, as is the case with the first embodiment shown in FIG. 2.

Figure 8:
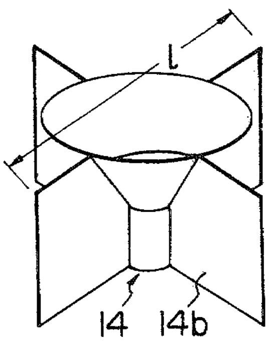
FIG. 8 is a perspective view of a modification of the deflector.

FIG. 8 shows a modification of the deflector 14 including legs **14*b* having a plate shape. The plate-shaped legs 14*b* are arranged around the conical frustum deflector 14 and disposed equidistantly from one another circumferentially around the deflector 14. The distance (l) from one end of one leg to one end of the opposite leg is equal to the inner diameter (d2) of the vessel 1. The deflector 14 shown in FIG. 8 can be readily positioned concentrically in the vessel 1. The deflector 14 having the plate-shaped legs 14*b*** can be applied to both the first and second embodiments of the invention.

From the foregoing description, the following can be appreciated. The deflector spreads the fuel vapor to the entire region of the adsorbent layer. Thus the adsorbent is utilized more effectively than the prior art.

The check valve set with the deflector introduces the purging air into the region of the adsorbent layer surrounded by the deflector. Thus the adsorbent is purged more effectively than the prior art.

In summary, according to the teaching of the invention, the whole adsorbent can be utilized more effectively. As the result, the adsorptive capability of the canister is improved significantly.

What is claimed is:

1. A canister for a fuel evaporative emission control system of an automotive vehicle, comprising:

a vessel;

an adsorbent layer disposed in said vessel for adsorbing vaporized fuel;

a vaporized fuel inlet conduit mounted at one end of said vessel and having an end portion inserted in said adsorbent layer; and a deflector of a conical frustum shape spreading toward an edge portion of one end of said vessel and having a bottom faced to an end of said vaporized fuel inlet conduit;

wherein the ratio (f/e) of the distance (f) between said end of said vaporized fuel inlet conduit and the surface of said bottom of said deflector to the inner diameter (e) of said end portion of said vaporized fuel inlet conduit is in the range between 0.7 and 1.4, the ratio (S1/S2) of the horizontal cross-sectional area (S1) of an upper end of said deflector having a maximum diameter (d1) to the horizontal cross-sectional area (S2) of said adsorbent layer having a diameter (d2) in said vessel is in the range between 0.4 and 0.6, and the ratio (a/b) of the distance (a) between the upper end of said deflector and an upper surface of said adsorbent layer to the distance (b) between an upper end of said deflector and a side surface of said adsorbent layer is in the range between 0.8 and 1.5.

2. A canister as set forth in claim 1, wherein said deflector is supported at an underside of its conical wall by four plate-like legs, a distance (l) from one end of one leg to one end of an opposite leg is equal to said inner diameter (d2) of said vessel.

3. A canister as set forth in claim 1, further comprising a check valve mounted on an underside of said bottom of said deflector, thereby air is introduced into a region of said adsorbent layer surrounded by said deflector.

4. A canister as set forth in any one of claims 1 to 3, further comprising a purging chamber being formed at a bottom portion of said vessel and being opened to the atmosphere through an air inlet port.

5. A canister as set forth in claim 4, further comprising a pair of punched plates formed with a multiplicity of perforations, one of said plates being secured in the form of a shelf to a lower portion of the inner part of said vessel and the other of said plates being superposed on said adsorbent.

6. A canister as set forth in claim 5, further comprising a pair of glass wool filters, one of said filters being superposed on the lower one of the punched plates and the other of said filters being superposed on said adsorbent.

7. A canister as set forth in any one of claims 1 to 3, further comprising a pair of punched plates formed with a multiplicity of perforations, one of said plates being secured in the form of a shelf to a lower portion of the inner part of said vessel and the other of said plates being superposed on said adsorbent.

8. A canister as set forth in claim 7, further comprising a pair of glass wool filters, one of said filters being superposed on the lower one of the punched plates and the other of said filters being superposed on said adsorbent.

9. A canister as set forth in any one of claims 1 to 3, further comprising a pair of glass wool filters, one of said filters being superposed on the lower end of said adsorbent and the other of said filters being superposed on the upper end of said adsorbent.

* * * * *